United States Patent
Coppin et al.

(10) Patent No.: US 7,305,611 B2
(45) Date of Patent: Dec. 4, 2007

(54) AUTHORING TOOL FOR REMOTE EXPERIENCE LESSONS

(75) Inventors: Peter Wesley Coppin, Pittsburgh, PA (US); Karl Frederik Fischer, Pittsburgh, PA (US)

(73) Assignee: Platform Digital LLC, Pittsburgh, PA (US)

( * ) Notice: Subject to any disclaimer, the term of this patent is extended or adjusted under 35 U.S.C. 154(b) by 189 days.

(21) Appl. No.: 10/225,140

(22) Filed: Aug. 22, 2002

(65) Prior Publication Data

US 2004/0039987 A1 Feb. 26, 2004

(51) Int. Cl.
G06F 17/00 (2006.01)

(52) U.S. Cl. .................. 715/502; 715/512; 345/419
(58) Field of Classification Search ................ 345/419, 345/427; 715/502, 512
See application file for complete search history.

(56) References Cited

U.S. PATENT DOCUMENTS

| | | | | |
|---|---|---|---|---|
| 5,601,436 | A * | 2/1997 | Sudman et al. | 434/307 R |
| 5,708,764 | A * | 1/1998 | Borrel et al. | 345/419 |
| 5,721,850 | A * | 2/1998 | Farry et al. | 715/700 |
| 5,923,324 | A * | 7/1999 | Berry et al. | 715/852 |
| 5,923,330 | A * | 7/1999 | Tarlton et al. | 345/419 |
| 6,023,278 | A * | 2/2000 | Margolin | 345/419 |
| 6,026,417 | A * | 2/2000 | Ross et al. | 715/517 |
| 6,144,381 | A * | 11/2000 | Lection et al. | 715/850 |
| 6,409,515 | B1 * | 6/2002 | Persohn et al. | 434/262 |
| 6,877,137 | B1 * | 4/2005 | Rivette et al. | 715/512 |
| 2002/0031756 | A1 * | 3/2002 | Holtz et al. | 434/362 |
| 2002/0113823 | A1 * | 8/2002 | Card et al. | 345/776 |
| 2002/0158905 | A1 * | 10/2002 | Bazzoni et al. | 345/760 |
| 2003/0031987 | A1 * | 2/2003 | Gore et al. | 434/156 |
| 2003/0169293 | A1 * | 9/2003 | Savage | 345/762 |
| 2003/0179193 | A1 * | 9/2003 | Adams, Jr. | 345/419 |

OTHER PUBLICATIONS

Mohageg, Mike, et al, "A User Interface for Accessing 3D Content on the World Wide Web", Proceedings of the SIGCHI Conference on Human Factors in Computing Systems: Common Ground, Apr. 1996, pp. 466-472.*

Jung, Thomas, et al, "Full Papers: Annotating and Sketching on 3D Web Models", Proceedings of the 7th International Conference on Intelligent User Interfaces, Jan. 2002, pp. 95-102.*

(Continued)

Primary Examiner—William Bashore
Assistant Examiner—Laurie Ries
(74) Attorney, Agent, or Firm—Westerman, Hattori, Daniels & Adrian, LLP.

(57) ABSTRACT

A computer-implemented presentation authoring method, tool, and interface is provided for creating a remote experience lesson defined with a hierarchy of pages, at least one of the pages including an interactive view of a three-dimensional model. Any number of three-dimensional models and views, and any number of two-dimensional images and views may be used for the pages of the lesson. Annotations are drawn directly in the three-dimensional space of the three-dimensional model and are associated with particular pages. Hotspot annotations provide a non-linear link to other pages in the hierarchy of pages. The authoring tool and interface allows the creation of richly interactive and visual lessons based on telepresence experiences of remote locations and objects.

20 Claims, 6 Drawing Sheets

OTHER PUBLICATIONS

Balaguer, Jean-Francis, et al, "i3D: A High-Speed 3D Web Browser", Proceedings of the First Symposium on Virtual Reality Modeling Language, Jan. 1995, pp. 69-76.*

Bolter, Jay David, "Writing on the World: The Rold of Symbolic Communication in Graphic Computer Environments", Proceedings of the 11th Annual International Conference on Systems Documentation, Nov. 1993, pp. 1-9.*

Mackay, Wendy E., "Invited Papers and Panel: Augmented Reality: Linking Real and Virtual Worlds: A New Paradigm for Interacting with Computers", Proceedings of the Working Conference on Advanced Visual Interfaces, May 1998, pp. 13-21.*

Naps, Thomas, et al. "Using the WWW as the Delivery Mechanism for Interactive, Visualization-Based Instructional Modules", ACM SIGCUE Outlook, vol. 25, Issue 4, Oct. 1997, pp. 13-26.*

Adams, Elizabeth S., et al, "Interactive Multimedia Pedagogies: Report of the Working Group on Interactive Multimedia Pedagogy", ACM SIGCSE Bulletin, vol. 28, Issue SI, Jun. 1996, pp. 182-191.*

Moher, Tom, et al, "Bridging Strategies for VR-Based Learning", Proceedings of the SIGCHI Conference on Human Factors in Computing Systems: the CHI is the Limit, May 1999, pp. 536-543.*

Shaw, Chris, et al, "Decoupled Simulation in Virtual Reality with the MR Toolkit", ACM Transactions on Information Systems (TOIS), vol. 11, Issue 3, Jul. 1993, pp. 287-317.*

Kramer, Axel, "Translucent Patches—Dissolving Windows", Proceedings of the 7$^{th}$ Annual ACM Symposium on User Interface Software and Technology, Nov. 1994, pp. 121-130.*

Corbit, Margaret, et al, "SciCentr and BioLearn: Two 3D Implementations of CVE Science Museums", Proceedings of the Third International Conference on Collaborative Virtual Environments, Sep. 2000, pp. 65-71.*

Jung, Thomas, et al, "Annotating and Sketching on 3D Web Models", Proceedings of the 7th International Conference on Intelligent User Interfaces, Jan. 2002, pp. 95-102.*

Lecolinet, E., et al, "An Integrated Reading and Editing Environment for Scholarly Research on Literary Works and Their Handwritten Sources", Proceedings of the Third ACM Conference on Digital Libraries, May 1998, pp. 144-151.*

Carr, Leslie, et al, "Conceptual Linking: Ontology-Based Open Hypermedia", Proceedings of the 10th International Conference on World Wide Web, Apr. 2001, pp. 334-342.*

Kramer, Axel, "Translucent Patches—Dissolving Windows", Proceedings of the 7$^{th}$ Annual ACM Symposium on User Interface Software and Technology, Nov. 1994, pp. 121-130.*

Shaw, Chris, et al, "Decoupled Simulation in Virtual Reality With the MR Toolkit", ACM Transactions on Information Systems (TOIS), vol. 11, Issue 3, Jul. 1993, pp. 287-317.*

Pentland, Alex, "Perceptual User Interfaces: Perceptual Intelligence", Communications of the ACM, vol. 43, Issue 3, Mar. 2000, pp. 35-44.*

Elliot, Jason, et al, "Section 01: Augmented Education: Design of a 3D Interactive Math Learning ENvironment", Proceedings of the Conference on Desiging Interactive Systrems, Jun. 2002, pp. 64-74.*

Spalter, Anne Morgan, et al, "Reusable Hypertext Structures for Distance and JIT Learning", Proceedings of the Eleventh ACM on Hypertext and Hypermedia, May 2000, pp. 29-38.*

Microsoft Computer Dictionary, Third Edition, Microsoft Press, 1997, pp. 467.*

* cited by examiner

AUTHORING TOOL FOR REMOTE EXPERIENCE LESSONS

BACKGROUND OF THE INVENTION

The present invention relates to interactive visual lessons. More particularly, the present invention relates to a presentation authoring tool and interface used to create richly interactive visual lessons including, for example, telepresence experiences of remote locations and objects.

Conventional products provide various presentation authoring capabilities. For instance, Microsoft PowerPoint is a tool used to create presentations based on a sequence of slides. Two-dimensional text and drawings can be edited on each slide. It is possible to add hyperlinks to slides so that the user can navigate the presentation in a nonlinear order. However, Microsoft PowerPoint does not provide any capabilities for visualizing or annotating three-dimensional models.

The World Wide Web standards, including the Hypertext Markup Language (HTML) and Hypertext Transfer Protocol (HTTP) as defined by the World Wide Web Consortium (W3C), specify an architecture that allows web pages made up of two-dimensional text and drawings to be navigated through hyperlinks. Some web browser plug-ins allow interactive three-dimensional models to be embedded in web pages. Some web based three-dimensional plug-ins and authoring systems include the Cortona Virtual Reality Modeling Language (VRML) client from ParallelGraphics, 3D Anywhere from 3Di Ltd., b3d from Brilliant Digital Entertainment, Inc., and Shockwave 3D from Macromedia, Inc.

However, the World Wide Web architecture does not provide any capabilities for visualizing or annotating three-dimensional models. In addition, while web browser plug-in products allow three-dimensional models to be incorporated in web-pages, these three-dimensional models exist in isolation. Interactive hotspot links to other web pages cannot be authored within these three-dimensional models. Some web authoring systems also require software programming skills to implement some interactivity.

QuadriSpace Presenter from QuadriSpace allows presentations to be created that incorporate interactive three-dimensional models. Presentations are organized as a sequence of slides. However, QuadriSpace Presenter does not allow annotations or hotspot links to be added to three-dimensional models.

SketchUp from @Last Software Inc. allows three-dimensional models to be imported and annotated with a variety of drawing tools. Annotations are drawn directly on the model and exist in the three-dimensional space of the model. SketchUp provides rich annotation capabilities for three-dimensional models, but it operates on only a single model at a time. It has no notion of a presentation made up of multiple model views. It has no notion of hyperlinking.

Adobe Atmosphere from Adobe Systems Inc. allows three-dimensional virtual worlds to be created and edited. Elements of a virtual world can be made interactive by writing programming scripts. However, Atmosphere has no notion of a presentation made up of separate pages or slides because information is organized as a combination of many three-dimensional models to make a continuous virtual world. Atmosphere also requires software programming skills to implement some interactivity.

Conventional presentation authoring tools, such as those described above, create presentations that are limited in various interactivity or visualization capabilities. In addition, it is sometimes more difficult to author presentations with the conventional products because some conventional products require software programming skills to implement some aspects of presentations.

BRIEF SUMMARY OF THE INVENTION

It is therefore an object of the present invention to provide an authoring tool and interface with interactivity and visualization capabilities that can create more richly interactive and visual presentations than conventional authoring tools.

It is another object of the present invention to provide an authoring tool and interface that allows the creation of richly interactive visual lessons using telepresence experiences of remote locations and objects.

It is a further object of the present invention to provide an authoring tool and interface that can create a lesson that contains multiple pages of interactive views of at least one three-dimensional model and/or at least one two-dimensional image, with annotations drawn on top of the three-dimensional model or in the two-dimensional image, and with annotations being able to link to other pages.

Objects of the invention are achieved by a computer-implemented presentation authoring method, tool, and interface for creating a lesson including a plurality of pages, at least one of the pages including an interactive view of a three-dimensional model, and drawing an annotation in the three-dimensional space of the three-dimensional model, the annotation being associated with a particular page. Any number of three-dimensional models and views, and any number of two-dimensional images and views may be used for the pages of the lesson. A hotspot annotation provides a non-linear link to another page in the hierarchy of pages.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawing, wherein like reference numerals refer to like elements throughout.

The present invention pertains to the creation of interactive visual presentations based on telepresence experiences of remote locations and objects. Such presentations involve lessons that include multiple pages organized into a hierarchical structure. The lessons are sometimes called remote experience lessons in the following description. The pages are sometimes called remote experience pages in the following description.

A person creating a remote experience lesson using the present invention is called an author. Almost anyone can be an author in view of the wide range of applications contemplated for the present invention (described below). A person using a completed remote experience lesson is called a user. The user is one or more persons interacting with a lesson on one or more computers. The user may also be a lecturer or presenter, presenting a lesson to an audience on an appropriate projection device or monitor. The lesson may also be presented as a fixed installation, such as an information kiosk or demonstration device, in a museum, science center, or the like, wherein the user is any person or group of people stopping by the fixed installation.

A remote experience page is an interactive view that is created and edited by an author and that is presented to a user. As mentioned above, a multiplicity of remote experience pages may be combined into an organized hierarchy for presentation as a remote experience lesson.

A remote experience page includes some or all of the following components: an interactive view of at least one three-dimensional model and/or at least one two-dimensional image; one or more panels showing the interactive view(s); an initial position and orientation for the interactive view(s); next and previous links for a progression of views; annotations; text; and a checkpoint flag.

The remote experience page includes one or more interactive views of one or more three-dimensional models and/or one or more interactive views of one or more two-dimensional images. One or more panels may be used to display these views for each page.

For each remote experience page in a lesson, next and previous pages may be defined. The user can step through the pages of a remote experience lesson using next and previous links. For a given page, any other page may be linked as the predecessor or successor of that page. Next and previous links allow the pages presented to the user to be ordered in arbitrary sequences, including loops.

Annotations may be drawn by the author on any particular page. The user may also have the option of creating annotations on a page as part of a lesson. Annotations include directional, explanatory, or highlight indicia, such as symbols, objects, icons, question marks, arrows, circles, translucent squares, flags, freehand drawings, text, and the like, that exist in the three-dimensional space of the model or in the two-dimensional image. Special colors may be specified for each annotation.

For a remote experience page, the author may also create an annotation with a link to another remote experience page that is not limited to the defined next or previous page. Such annotations with a link to another page are called hotspot annotations. When a hotspot annotation is selected, the page that the hotspot is linked to is displayed in place of the current page. Hotspot annotations are one way of adding interactivity to a lesson.

Appropriate text relevant to a particular page of a lesson may be presented in combination with the view. For instance, the author may provide textual questions for the user to answer or describe the relevance of the current view in relation to the overall lesson. Likewise, appropriate audio and/or video files may be associated with a particular page and played upon user activation or upon initial display of the page.

A checkpoint flag may be defined for a page. If the flag is set to be ON, then the user is allowed to save his or her own changes to the page. If the flag is set to be OFF, the user is not allowed to modify the page. This flag can be set ON for pages on which the user is expected to enter an answer to a question.

Appropriate navigation and authoring icons may be used in a graphical user interface for the authoring tool of the present invention. For instance, navigation icons may be provided so that the author or user may freely navigate through a three-dimensional space from the initial position and orientation to see the model from any other position and orientation.

The remote experience lessons may be used to present data, news, and/or commentary for a wide range of information, remote experiences, or current events. The data for a lesson may come from three-dimensional model art, three-dimensional CAD drawings, scanned images, or remote sensing devices such as robotic rovers and spacecraft. Such lessons may be used for teaching a wide range of topics from scientific concepts, such as planetary geology, to the humanities and arts. The interactive lessons may also be configured as an educational game or virtual instructions for using a device or instrument, such as tools, electronic devices, or even musical instruments. Such lessons may also be transmitted among members of a scientific research community to share research results, questions, and commentary. For example, doctors may use the present invention to share and collect interactive commentary on MRI data for a particular patient.

The present invention provides a fun and easy to use interface that allows educators, scientists, other specialists, and the layperson to author interactive guided remote experiences of three-dimensional virtual environments, events, and objects without requiring a background in programming. Unlike the conventional presentation tools, the authoring tool of the present invention creates richly interactive visual presentations through the combination of multiple pages of interactive views, with annotations that are able to link to other pages.

Preferred embodiments of the authoring tool of the present invention will now be explained with reference to the drawings. These drawings depict a preferred interface employing the authoring capabilities of the present invention. These drawings also show an exemplary structure of a remote experience lesson according to the present invention.

Figure 1:
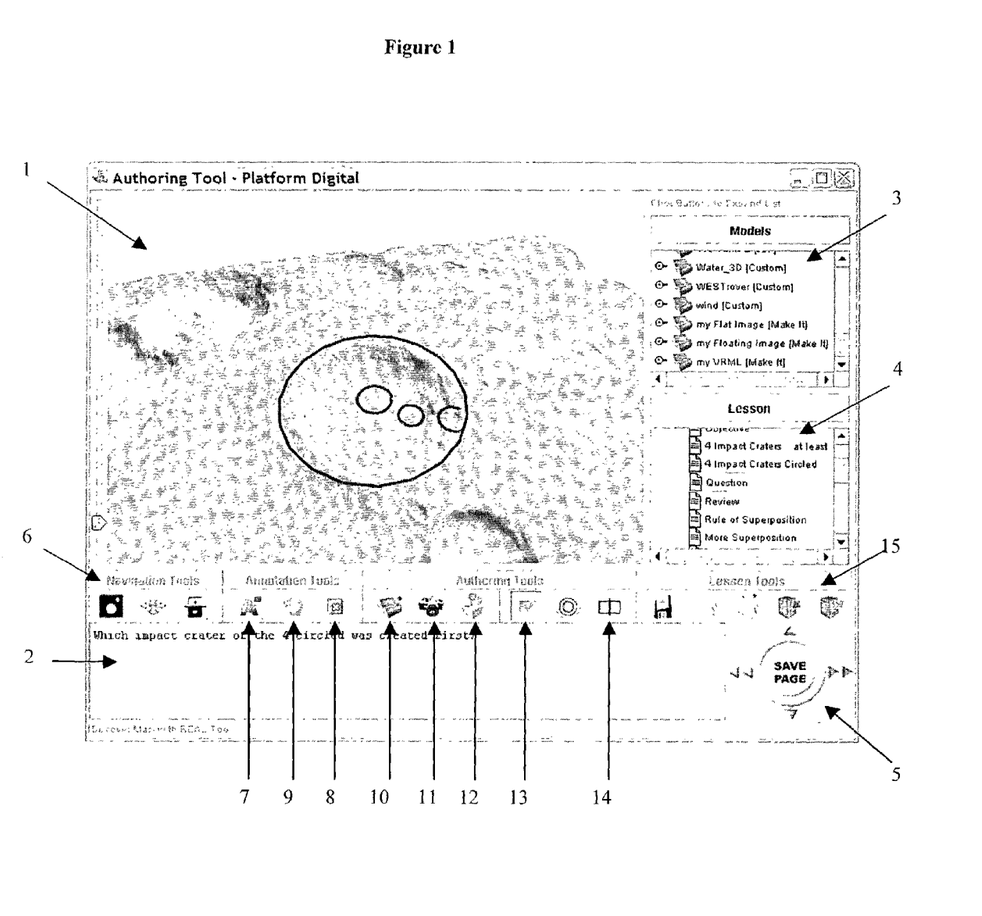
FIG. 1 depicts a graphical user interface in a preferred embodiment of the present invention.

In FIG. 1, one remote experience page is displayed in one panel of a graphical user interface. The main view 1 shows one interactive view of one three-dimensional model for the current remote experience page. The lesson text 2 shows descriptive text associated with the current page. The author can edit this text.

The model list 3 shows a list of models and images which are available to construct pages. Below each model in the model list 3, a list of views (position and orientation) and annotation sets associated with the model may be shown. When a model, view, or annotation set is selected, it is applied to the main view of the current remote experience page. A special entry in the model list labeled "my Flat Image" can be selected to import a two-dimensional image file into the list of available models. Another special entry in the model list labeled "my VRML" can be selected to import a VRML97 three-dimensional model file into the list of available models.

The lesson map 4 shows the remote experience pages that make up the current lesson. When a page is selected in the lesson map, it becomes the current page for viewing and editing. The page tools 5 are used to navigate through the hierarchy of remote experience pages in sequence, to create new pages in the hierarchy, and to save changes to existing pages. The navigation tools 6 are used to select different ways of navigating and viewing the current interactive view of the three-dimensional model in the main view 1.

The annotation button 7 expands into a list of annotation tools including pencil (freehand drawing), arrow, circle, flag, text, and square tools. Each of these tools may be used to add new annotation indicia (of the selected type) to the views of the three-dimensional models and two-dimensional images. Options are provided to set the color of annotations and to set hotspot links for annotations.

An annotation is drawn when the user selects an annotation tool and then clicks and drags the mouse or other pointing device within a three-dimensional model view or a two-dimensional image view. When an annotation is drawn on a three-dimensional model, the location of the annotation in three-dimensional space is determined by casting a ray along the sight line that is in the direction the user clicked on. The point of this ray's first intersection with the model is determined, and the annotation is positioned at a slight offset from this point, such that the annotation appears just above the surface of the model at the point the user clicked on. The arrow, circle, and square tools also use the point where the mouse is released in the same manner to determine the size and orientation of the resultant annotation. The pencil tool also uses the sequence of points that the mouse travels through while it is being dragged in the same manner to determine the shape of the resultant freehand drawing annotation.

The annotation undo button 8 deletes the last annotation drawn. The annotation redo button 9 reverses the deletion of the last annotation that was deleted with the annotation undo button so that the last deleted annotation becomes visible again.

The make model button 10 opens up an interface which allows a region of a digital elevation model (DEM) dataset to be selected. A three-dimensional model which represents the selected region is created and added to the model list.

The snap view button 11 saves the current view position and orientation. The view is added to the model list below the current model.

The snap annotations button 12 saves the current set of annotations. The annotation set is added to the model list below the current model.

The checkpoint button 13 determines whether the user is allowed to save changes to the current remote experience page.

The split panel button 14 selects either one panel or multiple panels for the main view. Each panel allows one interactive three-dimensional model or two-dimensional image to be displayed.

The lesson tools 15 allow remote experience lessons to be loaded and saved to a local or remote file storage system.

Using the interface depicted in FIG. 1 and the authoring capabilities accessible through that interface, an author can create a new remote experience lesson with new remote experience pages. In creating and editing the remote experience page, the author specifies one or more interactive views of one or more three-dimensional models and/or two-dimensional images; identifies an initial position and orientation for each view; draws and edits annotations on top of each three-dimensional model view or in each two-dimensional image; specifies links for hotspot annotations; define next and previous links; writes lesson text; and sets the checkpoint flag on or off.

Figure 2:
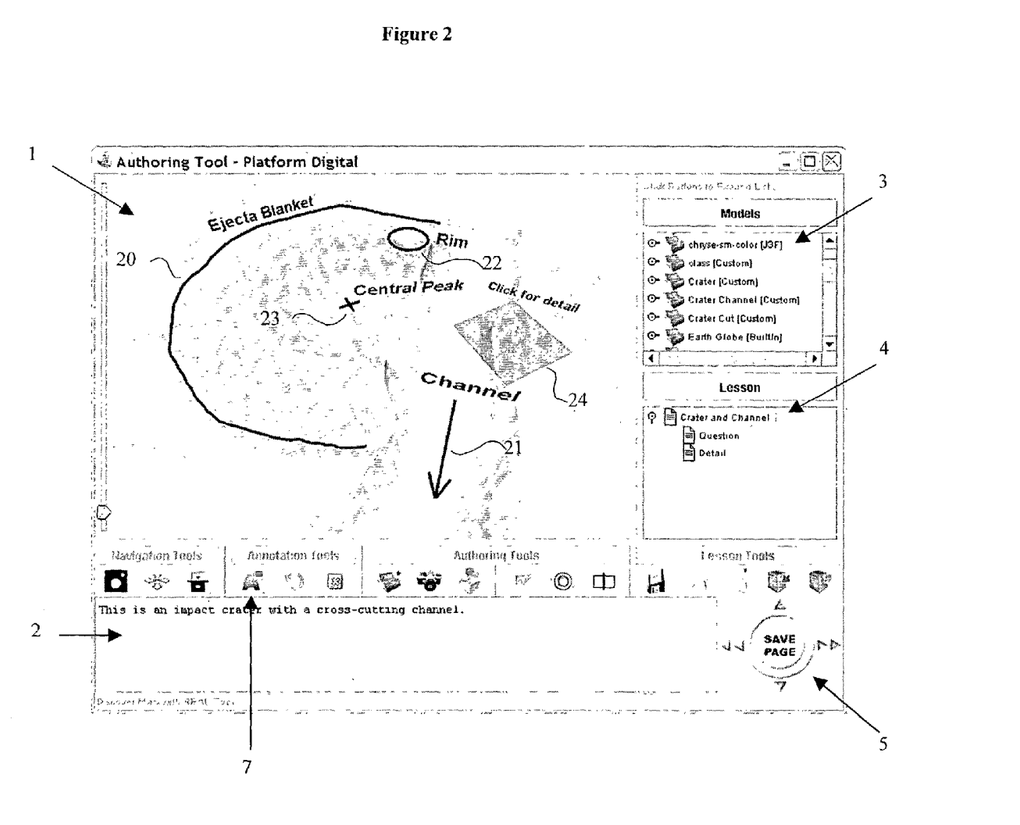
FIG. 2 is a first remote experience page of an exemplary remote experience lesson according to the present invention.
Figure 3:
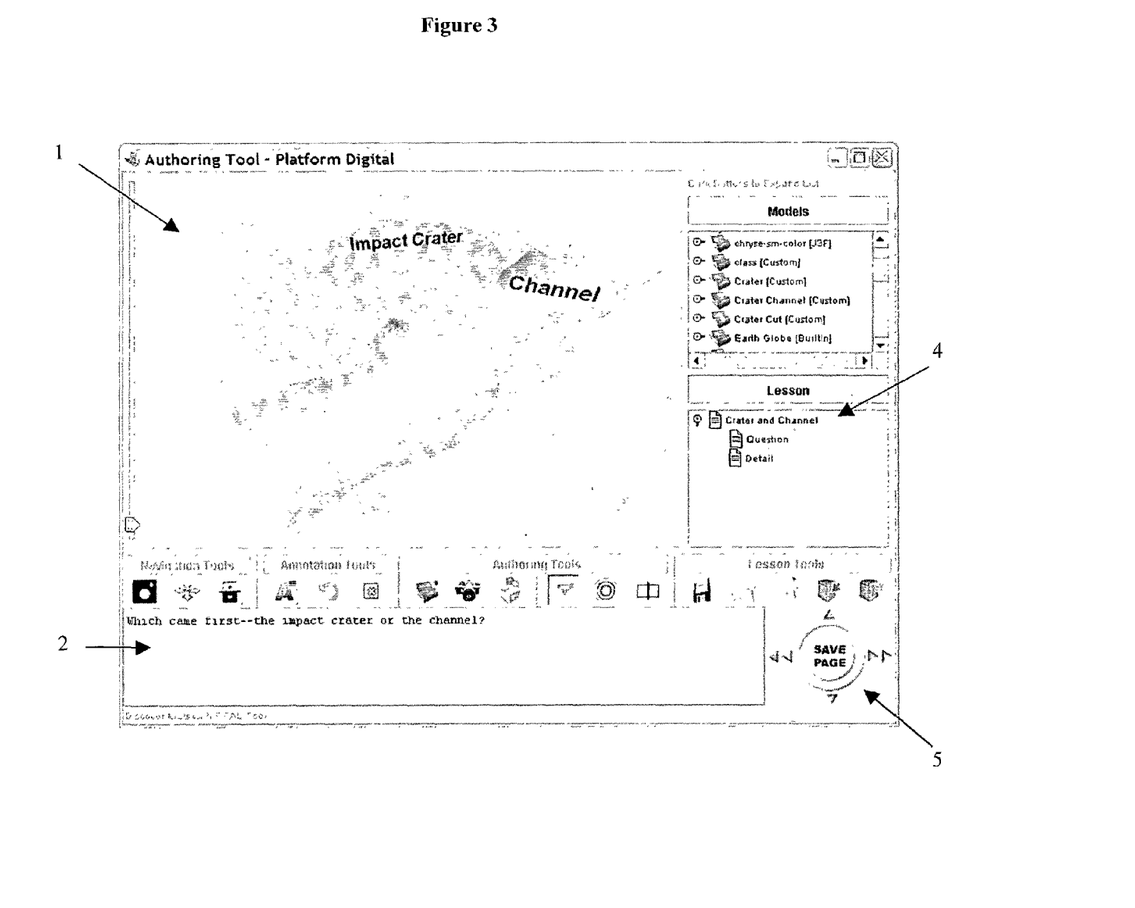
FIG. 3 is a second remote experience page of the exemplary remote experience lesson according to the present invention.
Figure 4:
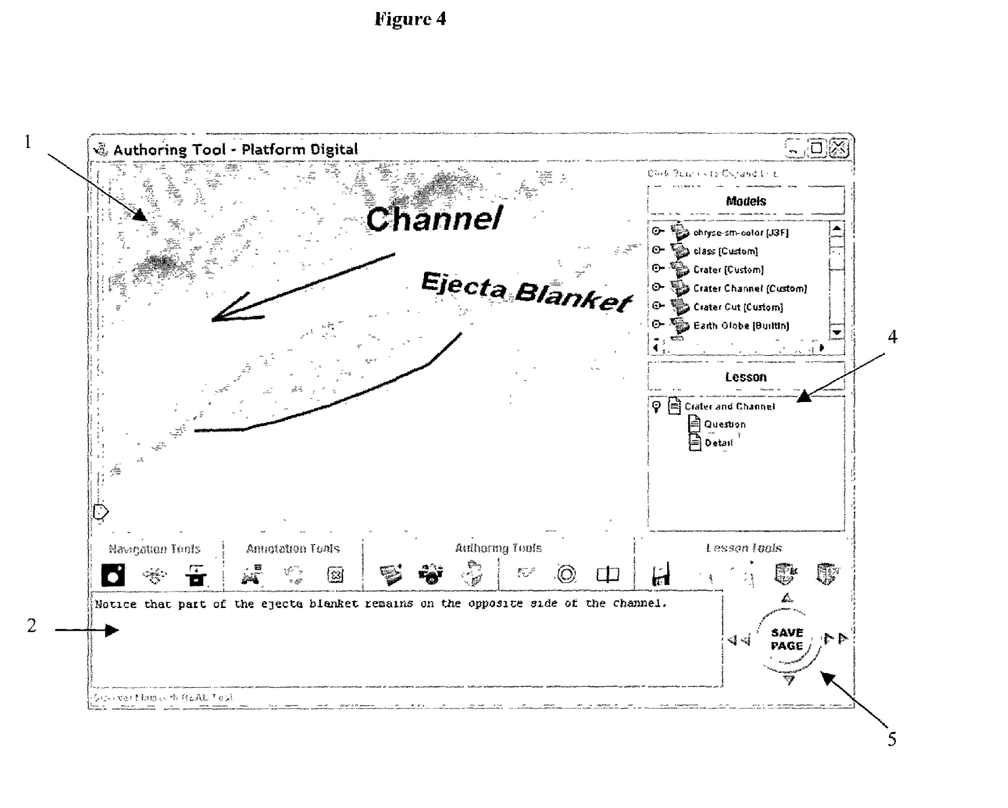
FIG. 4 is a third remote experience page of the exemplary remote experience lesson according to the present invention

FIGS. 2-4 depict three pages of an exemplary remote experience lesson that was created according to the present invention using a three-dimensional model entitled "Crater Channel" as listed in the model list 3. As apparent from FIGS. 2-4, this exemplary remote experience lesson is for planetary geology that may be used for students or visitors to a science center, as mentioned above.

FIG. 2 shows the first page in the lesson entitled "Crater and Channel" as identified in the lesson map 4. The lesson text 2 for the remote experience page shown in FIG. 2 describes the page to be an impact crater with a cross-cutting channel. The initial viewing position and orientation depicted in the main view 1 for the Crater and Channel page was defined by the author using the navigation tools 6 to move the viewing position and orientation as desired.

By using the various annotation indicia available through the annotation button 7, various annotations are defined in the three-dimensional space of the interactive view. A freehand drawing annotation 20 has text annotation "Ejecta Blanket." An arrow annotation 21 has text annotation "Channel." A circle annotation 22 has text annotation "Rim." A flag annotation 23 (shown as an "X") has text annotation "Central Peak." A square annotation 24 has text annotation "Click for detail."

The next page link defined for the first page of this lesson is to the page entitled "Question" identified in the lesson map 4. Activating the right directional double arrows in the page tools 5, or selecting the "Question" page in the lesson map 4 changes the main view 1 to the interactive view of the three-dimensional model shown in FIG. 3.

FIG. 3 is the second page of the "Crater and Channel" lesson. The second page has an initial position and orientation defined to provide a different view of the same "Crater Channel" three-dimensional model. The lesson text 2 for the "Question" page poses a question, "which came first—the impact crater or the channel?" Only text annotations "Impact Crater" and "Channel" are defined for this page. The next link for the "Question" page is to the "Detail" page. The previous link for the "Question" page is back to the "Crater and Channel" page.

Since the first and second pages of the "Crater and Channel" lesson use the same three-dimensional model, the current viewing position and orientation for that model shown in the main view 1 will be moved in a smooth animation to the initial position and orientation specified for the "Question" page upon transitioning from the first page to the second page. This effect improves continuity between pages.

Moreover, while a three-dimensional model view is in motion, the model may be displayed in an optimized form that is faster to draw. This allows the animated motion to be more smooth. Typically the amount of detail in the model will be reduced for the optimized form. For example, the landscape details may be omitted so that only landscape outlines are drawn during the animated motion. When the model view stops moving, the fully detailed unoptimized form of the model will be displayed again.

Navigating along the progression of pages in the lesson will reach the third and last page entitled "Detail" as identified in the lesson map 4. The "Detail" page is yet another view of the same "Crater Channel" three-dimensional model, but at a different initial viewing position and orientation. The lesson text 2 for the "Detail" page notifies the user that "part of the ejecta blanket remains on the opposite side of the channel."

Figure 5:
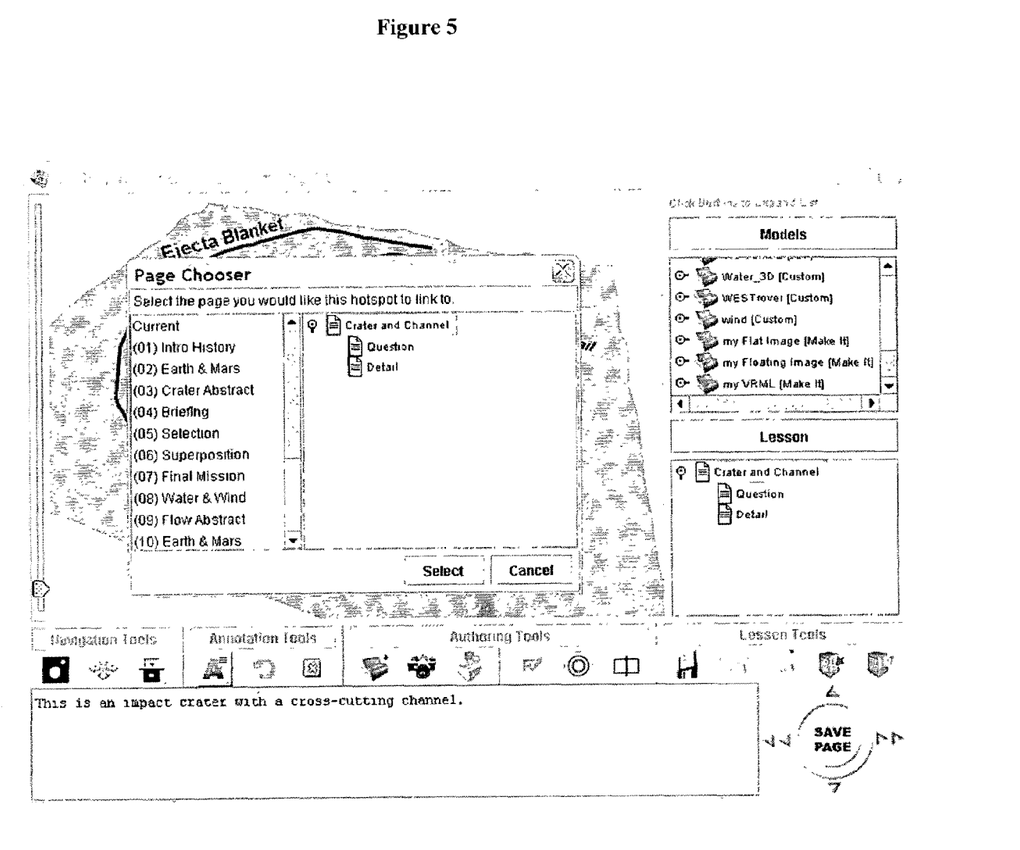
FIG. 5 shows how a hotspot annotation is defined.

By using the authoring capability of the present invention for defining a hotspot annotation, the author of this lesson was able to define a link for the square annotation 24 in the "Crater and Channel" page shown in FIG. 2 to the "Detail" page shown in FIG. 4. FIG. 5 shows the "Page Chooser"

pop-up screen that appeared when the author defined the link for the square annotation 24. After defining the "Detail" page, the author returned to the first page of the lesson and defined a link to the "Detail" page for the square annotation 24. Thus, the square annotation 24 was defined to be a hotspot annotation. Clicking on the square annotation 24 with a pointing device will transition the main view 1 through a smooth animation to the initial viewing position and orientation defined for the "Detail" page.

Figure 6:
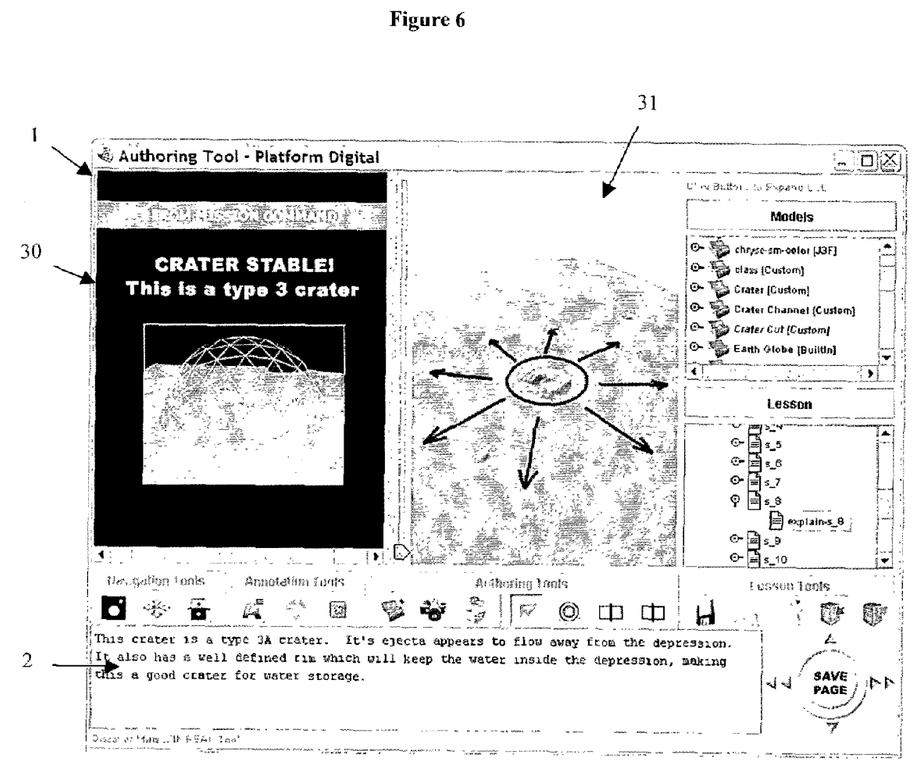
FIG. 6 illustrates multiple panels and multiple views of a three-dimensional model and a two-dimensional image.

FIG. 6 is an example of using multiple panels to simultaneously depict multiple views. FIG. 6 shows a two-dimensional image on the left panel 30 and a three-dimensional model in the right panel 31.

One implementation of the present invention is through the use of the Java programming language using the Java 3D application programming interface (API). Such an implementation should be portable to any hardware platform that supports Java and Java 3D and can be run on computers with Intel Pentium and compatible processors running Microsoft Windows 95 and later operating systems.

Of course, a wide range of different implementations of the present invention is also possible. For instance, the present computer-implemented presentation authoring tool and interface may be implemented using any combination of computer software and hardware systems. Any combination of software programming languages, operating systems, graphics display systems, user input devices, storage devices, and network communication devices may be considered for implementation of the invention.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A computer-implemented method of creating an interactive visual lesson, comprising:
   creating a lesson map identifying a plurality of pages that constitute the interactive virtual lesson, each of the pages including a different interactive view of a three-dimensional model having a three-dimensional space, the respective interactive views of the three-dimensional model being defined by coordinates in the three-dimensional space;
   displaying a page selected from the plurality of pages on a graphical user interface of a computer, which selected page includes an interactive view of the three-dimensional model;
   drawing an annotation on the three-dimensional model included in the displayed page, the annotation being defined by coordinates in the three-dimensional space of the three-dimensional model;
   defining, in connection with the annotation drawn on the three-dimensional model included in the displayed page, a link to an arbitrary page different from the displayed page and selected from the plurality of pages that constitute the virtual lesson;
   navigating through the interactive virtual lesson in a non-linear fashion by activating the link defined in connection with the annotation drawn on the three-dimensional model; and
   displaying the arbitrary page linked to the annotation.

2. A method according to claim 1, wherein the at least one of the pages further includes an interactive view of a two-dimensional image.

3. A method according to claim 1, wherein the at least one of the pages further includes a second three-dimensional model.

4. A method according to claim 1, wherein the at least one of the pages includes a plurality of three-dimensional models and a plurality of a two-dimensional images.

5. A method according to claim 1, further comprising configuring an initial viewing position and orientation for the interactive view of the at least one of the pages.

6. A method according to claim 1, further comprising transitioning from the interactive view of the at least one of the pages to a second interactive view of the three-dimensional model in another one of the pages using a smooth animation.

7. A method according to claim 6, further comprising optimizing the smooth animation by using an alternate form of the three-dimensional model that is faster to draw while the model is in motion.

8. A method according to claim 1, further comprising selecting the annotation from a list of annotation types including arrows, circles, squares, flags, freehand drawings, and text.

9. A method according to claim 1, further comprising setting a color and a translucency for the annotation.

10. A method according to claim 1, further comprising specifying a link to another one of the pages for the annotation.

11. A method according to claim 10, further comprising displaying the linked page when a user selects the annotation.

12. A method according to claim 1, further comprising defining for each of the pages a next page and a previous page in a sequence of pages for the lesson.

13. A method according to claim 1, further comprising adding descriptive text to one of the pages.

14. A method according to claim 1, further comprising setting for each of the pages a flag permitting user changes to each of the pages.

15. A method according to claim 1, further comprising importing data from external sources for use in the lesson.

16. A method according to claim 1, further comprising creating the three-dimensional model from a digital elevation model dataset.

17. A method according to claim 1, further comprising loading and saving the lesson from a file storage system.

18. A graphical user interface for accessing a computer-implemented presentation authoring tool, said interface comprising:
   a lesson map identifying a plurality of pages that constitute a virtual lesson, each of the pages including a different interactive view of a three-dimensional model having a three-dimensional space, the respective interactive views of the three-dimensional model being defined by coordinates in the three-dimensional space;
   a display to display a page selected from the plurality of pages that constitute the virtual lesson, the selected page including an interactive view of the three-dimensional model;
   an annotation icon for drawing an annotation on the three-dimensional model included in the displayed page, the annotation being defined by coordinates in the three-dimensional space of the three-dimensional model and associated with the at least one of the pages;
   means for defining, in connection with an annotation drawn on the three-dimensional model included in the displayed page, a link to an arbitrary page different from the displayed page and selected from the plurality of pages that constitute the virtual lesson; and means for navigating through the interactive virtual lesson in a non-linear fashion by activating the link defined in connection with the annotation drawn on the three-dimensional model, wherein the arbitrary page linked to the annotation is displayed on the display.

19. A computer-implemented method of creating an interactive visual presentation, comprising:

creating a plurality of lesson maps, each of the plurality of lesson maps identifying a plurality of pages that constitute an interactive virtual lesson, each of the pages including a different interactive view of a three-dimensional model having a three-dimensional space, the respective interactive views of the three-dimensional model being defined by coordinates in the three-dimensional space where each coordinate in three-dimensional space is represented by a page icon that represents each view and a plurality of pages respectively represent the plurality of interactive views;

displaying a page selected from the plurality of pages in a first lesson map on a graphical user interface of a computer, which selected page includes an interactive view of the three-dimensional model;

drawing an annotation on the three-dimensional model included in the displayed page, the annotation being defined by coordinates in the three-dimensional space of the three-dimensional model;

defining, in connection with the annotation drawn on the three-dimensional model included in the displayed page, a link to an arbitrary page in a second lesson map different from the first lesson map. the arbitrary page in the second lesson map being different from the displayed page and selected from the plurality of pages in the second lesson map;

navigating through the plurality of different interactive views in respective virtual lessons in a non-linear fashion by activating the link defined in connection with the annotation drawn on the three-dimensional model; and displaying the arbitrary page linked to the annotation.

20. A computer-implemented presentation authoring tool for creating an interactive visual lesson, comprising:

means for creating a lesson map identifying a plurality of pages that constitute the interactive virtual lesson, each of the pages including a different interactive view of a three-dimensional model having a three-dimensional space, the respective interactive views of the three-dimensional model being defined by coordinates in the three-dimensional space;

means for selecting a page from the plurality of pages, the selected page including an interactive view of the three dimensional model;

a display including a graphical user interface to display the page selected from the plurality of pages;

means for drawing an annotation on the three-dimensional model included in the page displayed on the display, the annotation being defined by coordinates in the three-dimensional space of the three-dimensional model;

means for defining, in connection with the annotation drawn on the three-dimensional model included in the displayed page, a link to an arbitrary page different from the displayed page and selected from the plurality of pages that constitute the virtual lesson; and means for navigating through the interactive virtual lesson in a non-linear fashion by activating the link defined in connection with the annotation drawn on the three-dimensional model, wherein the arbitrary page linked to the annotation is displayed on the display.

* * * * *